United States Patent
Marla et al.

(10) Patent No.: US 12,437,332 B2
(45) Date of Patent: Oct. 7, 2025

(54) ENABLING THIRD-PARTY CONTENT OVERLAY

(71) Applicant: ServiceNow, Inc., Santa Clara, CA (US)

(72) Inventors: Aditya Marla, Hyderabad (IN); Sarup Paul, Pleasanton, CA (US); Mayank Agrawal, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 370 days.

(21) Appl. No.: 17/529,055

(22) Filed: Nov. 17, 2021

(65) Prior Publication Data

US 2023/0153895 A1 May 18, 2023

(51) Int. Cl.
*G06Q 30/0601* (2023.01)
*G06F 3/04847* (2022.01)

(52) U.S. Cl.
CPC ..... *G06Q 30/0641* (2013.01); *G06F 3/04847* (2013.01)

(58) Field of Classification Search
CPC .............. G06Q 30/0641; G06F 3/04847
See application file for complete search history.

(56) References Cited

U.S. PATENT DOCUMENTS

| | | | | |
|---|---|---|---|---|
| 2011/0282888 | A1* | 11/2011 | Koperski | G06F 16/951 707/E17.061 |
| 2014/0258972 | A1* | 9/2014 | Savage | G06F 9/451 717/106 |
| 2015/0200952 | A1* | 7/2015 | Cairns | H04L 63/126 726/4 |
| 2019/0068703 | A1* | 2/2019 | Vora | H04L 67/34 |
| 2019/0121994 | A1* | 4/2019 | Embiricos | G06F 21/6218 |
| 2020/0380513 | A1* | 12/2020 | Phillips | G06Q 30/0613 |
| 2021/0234916 | A1* | 7/2021 | Galloway | H04L 67/60 |
| 2021/0294671 | A1* | 9/2021 | Hirsekorn | G06F 9/541 |
| 2022/0038430 | A1* | 2/2022 | Fagan | H04L 63/0807 |
| 2022/0058719 | A1* | 2/2022 | Jain | G06Q 30/0635 |
| 2024/0086475 | A1* | 3/2024 | Chandra | G06F 16/9562 |

* cited by examiner

*Primary Examiner* — Reji Kartholy
(74) *Attorney, Agent, or Firm* — MCDONNELL BOEHNEN HULBERT & BERGHOFF LLP

(57) ABSTRACT

A graphical interface is provided by a second-party service provider for specifying parameters for content of a third-party configured for a first-party, wherein the first-party, the second-party service provider, and the third-party are different parties. The parameters for the content of the third-party are received from the first-party. A code snippet that references a service resource of the second-party service provider is provided to include on a source encoding of a web content of the first-party. The code snippet provides in an overlay on the web content of the first-party, the content of the third-party obtained using the received parameters of the first-party.

16 Claims, 8 Drawing Sheets

ENABLING THIRD-PARTY CONTENT OVERLAY

BACKGROUND OF THE INVENTION

Web resources allow a business to provide customers with a vast amount of resources. For example, a corporate website can provide service and product catalogs, a list of retail locations and their hours, the ability to place and manage orders, and the ability to book appointments, among many other services. Allowing the data and related services to be accessible from network accessible resources such as corporate websites allows customers to access the services of the business at the convenience of each customer.

BRIEF DESCRIPTION OF THE DRAWINGS

Various embodiments of the invention are disclosed in the following detailed description and the accompanying drawings.

DETAILED DESCRIPTION

Figure 1:
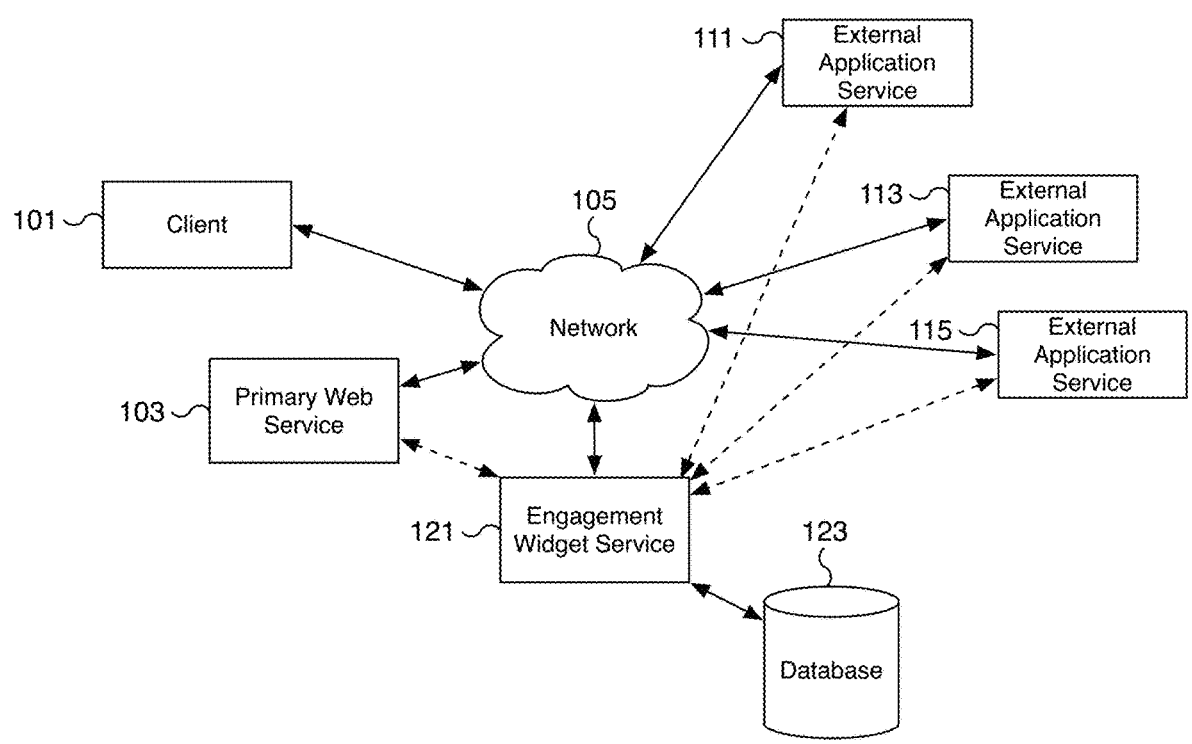
FIG. 1 is a block diagram illustrating an example of a network environment for providing a content overlay service.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A content overlay service is disclosed. Using the disclosed techniques, content from a variety of different parties including first-party and third-party services can be merged into a universal content overlay widget and embedded on a website. In some embodiments, the overlayed content is presented within an engagement widget that is embedded on a customer website. The engagement widget allows users accessing the website to directly access content provided by different related services. For example, a customer accessing a corporate website can utilize an embedded engagement widget to review product catalogs, list nearby retail locations and their hours, place and manage orders, and book appointments, among many other services. Individually, each of these services or tasks may be provided or supported by different first and/or third-party services. Instead of requiring the user to navigate away from the corporate website to access each different service, the user can instead engage each of the provided services from the corporate website by utilizing the embedded engagement widget.

In various embodiments, the overlayed content of an embedded engagement widget is provided by an engagement widget service configured to access each of the provided related application services. For example, an engagement widget service running as a cloud service can access different external application services such as a service to track appointments, another service to monitor shipping status, and a different service to track the refund status of a past order, among others. The engagement widget service merges content from the different services and presents them in an interactive widget that can be embedded in a website. In various embodiments, the integration of the widget requires very little development effort and minimal upkeep even when the accessed services change.

In some embodiments, a second-party service provider provides a graphical interface for specifying parameters for content of a third-party configured for a first-party, wherein the first-party, the second-party service provider, and the third-party are different parties. For example, a second-party service such as an engagement widget service provides an embedded engagement widget that includes both content and a graphical user interface that is embedded on the website of a first-party, such as a customer of the engagement widget service. The engagement widget service merges content provided by different third-party services utilized by the first-party. Examples of third-party services that can be utilized by a first-party include services related to a customer relationship management (CRM) system, an enterprise resource planning (ERP) system, an order processing system, an IT ticketing system, third-party web documents, third-party widgets, and content management systems, among others. In various embodiments, the third-party service is a remote database table service and allows the user to access, query, and manipulate remote database tables and their entries. In some embodiments, the parameters for the content of the third-party are received from the first-party. For example, a user interacts with a first-party customer website by utilizing the embedded engagement widget. The interaction parameters provided from the user interaction with the embedded engagement widget are used for accessing and/or manipulating the content provided by the third-party services. For example, the interaction parameters allow the user to interact with the provided content, such as reviewing orders, tracking orders, submitting tickets, etc.

In some embodiments, a code snippet is provided to include on a source encoding of a web content of the first-party to provide in an overlay on the web content of the first-party. For example, after configuring the engagement manager widget using the engagement widget service, a corresponding source code snippet is provided for including in the webpage source of the first-party. The provided snippet that is included in the customer's webpage invokes the embedded engagement widget, which provides the web content overlay. In some embodiments, the content of the third-party is obtained using the received parameters of the first-party. For example, a user interacts with a first-party customer website by utilizing the embedded engagement widget and the interaction parameters provided from the user interaction with the embedded engagement widget are used to obtain the associated content from third-party services. In some embodiments, the code snippet references a service resource of the second-party service provider. For example, the code snippet references the engagement widget service that is hosted by the second-party service provider. In some embodiments, the second-party service provider is a cloud service provider that hosts the engagement widget service for first-party customers.

FIG. 1 is a block diagram illustrating an example of a network environment for providing a content overlay service. In the example shown, client 101 accesses primary web service 103, which provides web services including an embedded engagement widget serviced by engagement widget service 121. Engagement widget service 121 is a cloud-base content overlay service that supports multiple external application services such as external application services 111, 113, and 115. Engagement widget service 121 utilizes database 123 for providing the content overlay service including for configuring and servicing an embedded engagement widget embedded at a webpage hosted by primary web service 103. As shown in the example, client 101, primary web service 103, engagement widget service 121, and external application services 111, 113, and 115 are communicatively connected via network 105. In some embodiments, network 105 is a public network such as the Internet. Although the components of FIG. 1 are communicatively connected via network 105, the dotted lines in FIG. 1 connecting primary web service 103 to engagement widget service 121 and each of external application services 111, 113, and 115 to engagement widget service 121 reflect configured connections between the corresponding components as configured to enable an overlay service for primary web service 103 that incorporates services from external application services 111, 113, and 115.

In some embodiments, client 101 is a web client such as a network client with a web browser for accessing web-based services such as primary web service 103. The accessed services include webpages that can be configured to include an embedded engagement widget for interacting with multiple different web services including third-party web services. For example, in some embodiments, primary web service 103 is associated with additional related third-party web services that are hosted external to primary web service 103, such as by external application services 111, 113, and/or 115. Using the disclosed content overlay service, client 101 can access these externally hosted web services associated with primary web service 103 via an engagement widget embedded on the webpages hosted by primary web service 103. For example, when utilizing an engagement widget embedded on a webpage of primary web service 103, client 101 can access theses external services directly within the embedded engagement widget without navigating away from primary web service 103. Although only a single client is shown in FIG. 1, client 101 is but one example of a client and multiple additional clients can exist in the network environment.

In some embodiments, primary web service 103 offers and hosts web services. Primary web service 103 may be the primary website for an organization and can host and service the organization's homepage. However, in addition to offering services provided by primary web service 103, primary web service 103 may also offer additional services to its customers/clients that are hosted externally, such as by external application services 111, 113, and/or 115. For example, primary web service 103 can provide web content related to product offerings of an organization while external application services can provide additional services related to the organization such as the ability to purchase the organization's products, track past orders, and interact with a chat assistant to answer questions, among others services. Using the disclosed content overlay service, primary web service 103 can embed access to multiple different services within an engagement widget on a webpage serviced by primary web service 103. The embedded services can include the services offered directly by primary web service 103 as well as externally hosted services such as services offered by external application services 111, 113, and/or 115. For example, externally hosted services (e.g., services hosted by external application services 111, 113, and/or 115) are integrated with locally provided services (i.e., services hosted by primary web service 103) by offering the different services as embedded services within an engagement widget. By providing the services via an engagement widget embedded within a webpage serviced by primary web service 103, a client is provided with a consistent and uniform user interface for accessing different services, regardless of where the services are hosted. In various embodiments, an externally hosted service appears to the client as if it is being hosted by primary web service 103 despite being hosted by an external application service. From the perspective of the client, the embedded services all appear as first-class services and the client interacts with each of the embedded offered services in a similar manner.

In some embodiments, engagement widget service 121 is an application service that provides a content overlay service. For example, engagement widget service 121 provides a service for implementing an engagement widget that can be embedded in a webpage and overlays content from multiple different application services. Using engagement widget service 121, an administrator of an organization, such as an administrator of primary web service 103, can configure the services an engagement widget can offer within an embedded webpage widget. In various embodiments, engagement widget service 121 provides a source code module for including in the organization's webpages, such as within the webpages hosted by primary web service 103. When the embedded engagement widget is accessed, the source code module is initiated to create a widget user interface that provides a client of the webpage access to the configured services, all from within a webpage hosted by the organization. In various embodiments, engagement widget service 121 utilizes database 123 for configuring and implementing the content overlay service. For example, the configuration parameters for each engagement widget can be stored at database 123.

In some embodiments, external application services 111, 113, and 115 offer auxiliary application services to enhance a primary web service. For example, each of external application services 111, 113, and 115 can provide a custom experience for users of different organizations, for example, based on the services utilized by the different referring organizations. In some embodiments, external application services 111, 113, and/or 115 may even be directly accessible from a client such as client 101 with the tradeoff that direct access requires the client to navigate away from the referring webpage such as the homepage of an organization. However, by integrating an engagement widget provided by engagement widget service 121 in an organization's webpages, clients of a primary web service such as primary web service 103 can access the services offered by external application services such as external application services 111, 113, and 115 from within the webpages serviced by the primary web service.

Although single instances of some components have been shown to simplify the diagram of FIG. 1, additional instances of any of the components shown in FIG. 1 may also exist. For example, primary web service 103 and/or engagement widget service 121 may include one or more different servers and/or multiple components. Similarly, database 123 may include one or more database servers and may not be directly connected to engagement widget service 121. For example, database 123 and its components may be replicated and/or distributed across multiple servers and/or components. In some embodiments, external application services 111, 113, and 115 can each be implemented using one or more different services and may each rely on one or more different external data sources (not shown). In some embodiments, components not shown in FIG. 1 may also exist.

Figure 2:
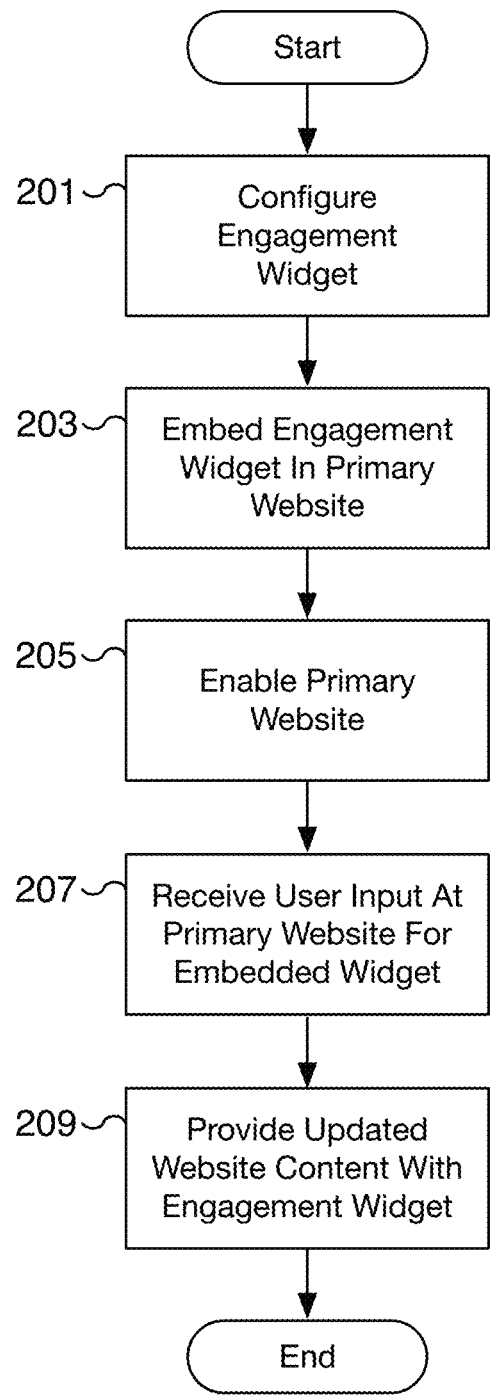
FIG. 2 is a flow chart illustrating an embodiment of a process for implementing a content overlay service.

FIG. 2 is a flow chart illustrating an embodiment of a process for implementing a content overlay service. Using the process of FIG. 2, a content overlay service is utilized to configure an engagement widget. Once configured, a source code module associated with the configured widget is provided by the overlay service. The source code module or snippet is included in a webpage to embed the configured engagement widget. When a user accesses the corresponding webpage, the widget is initialized and provides a widget user interface embedded within the webpage. The widget embedded within the webpage allows the user to navigate through and interact with different types of content including content originating from a source external to the webpage's application server, such as content provided by external application services. In some embodiments, the client used to configure an embedded engagement widget and/or access the content overlay service is client 101 of FIG. 1 and the configuration of an embedded engagement widget is performed via a webpage hosted by engagement widget service 121 of FIG. 1. In some embodiments, the configured engagement widget is embedded in a webpage hosted by primary web service 103 of FIG. 1. In some embodiments, the content overlay service is provided by engagement widget service 121 of FIG. 1 and the external application services accessible by the embedded engagement widget are provided by external application services 111, 113, and 115 of FIG. 1. In some embodiments, data of the content overlay service and/or the embedded widget such as configuration data and/or parameters is stored in a database associated with the engagement widget service such as database 123 of FIG. 1.

At 201, an engagement widget is configured. For example, a client can access a web-based configuration service of the engagement widget service to set up and configure an engagement widget. In various embodiments, the configuration includes configuring the services to be made available within the engagement widget. For example, a domain and access parameters such as an Application Programming Interface (API) key and/or login credentials can be provided to the configuration service for different embedded services as required. Additionally, the user interface of the widget for each service can be configured. For example, the type of service, the display fields, the display type, and other parameters of the widget and associated services can be configured. In some embodiments, the widget configuration service includes a preview tool to preview how the widget will appear to a user.

At 203, the engagement widget is embedded in a primary website. For example, the configuration service of the engagement widget service provides a source code module or snippet for referencing the engagement widget configured at 201. The provided source code is included in the primary website where the engagement widget is to be embedded. For example, in some embodiments, the webpage source code includes a provided JavaScript widget source code snippet that invokes the configured engagement widget when the webpage is loaded by a client. In various embodiments, the widget source code module or snippet references the engagement widget service, which is different from the primary website. For example, the primary website can be hosted by a first party, the engagement widget service can be hosted by a second party, and the different accessible external services can be hosted by one or more different third parties and/or the primary website.

At 205, the primary website is enabled. For example, the webpage with the embedded engagement widget is activated and made accessible to clients. In some embodiments, the primary website includes one or more webpages with the embedded engagement widget. Once the website is enabled, clients can access the webpages hosted at the primary website. In various embodiments, when an embedded engagement widget on a website is accessed, the widget is presented as an overlay within the associated website. The widget provides the client access to the services configured at 201.

At 207, user input is received from a client at the primary website for the embedded engagement widget. For example, a client accessing the primary website provides user input such as mouse clicks, mouse navigation, keyboard input, touch input, or other user interface actions as part of interacting with an embedded engagement widget. The user input is received by the primary website and processed for the current webpage. When accessing the embedded engagement widget, the user input is initially received at the primary website since the user has not navigated away from the primary website. In the event the user is interacting with the embedded engagement widget of the website, the user input is further processed by the widget.

At 209, updated website content is provided with the engagement widget. For example, the user input received at 207 is processed by the embedded engagement widget. In response to the user interaction, the user interface of the engagement widget is updated, for example, to display updated content. The updated content can be sourced from an external application service configured at 201 for the engagement widget. For example, in some embodiments, a user can access an external service for order tracking from within the embedded engagement widget. As the user interacts with the order tracking service, the progress of the order can be displayed in the user interface of the engagement widget, which is embedded within the primary website. Other services as configured at 201 can be accessed as well and corresponding updates including content updates are provided based on the user interaction.

Figure 3:
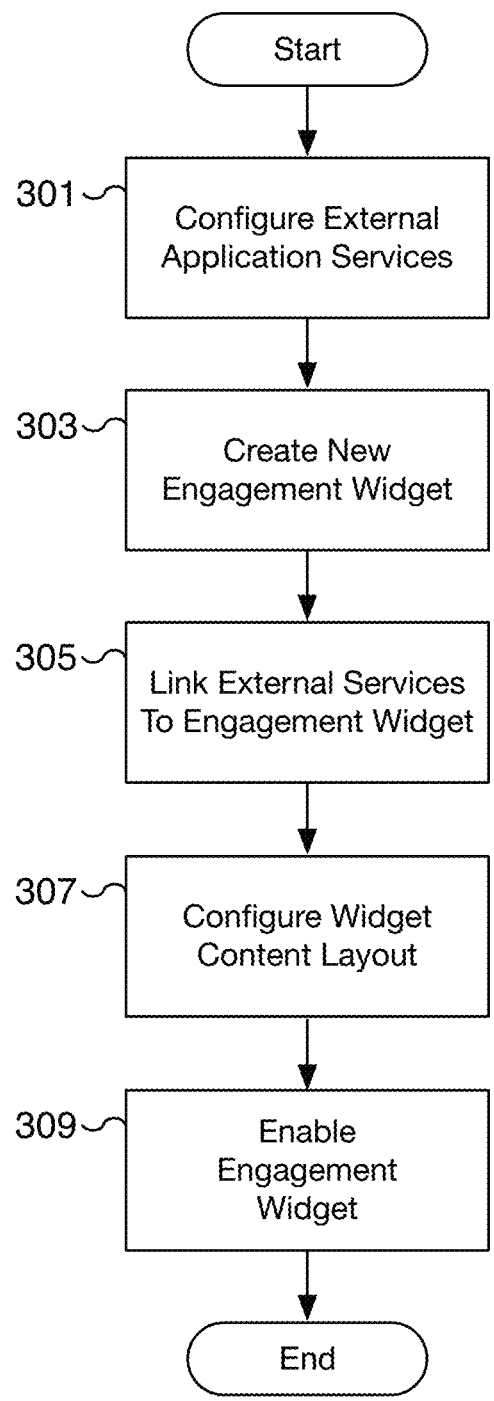
FIG. 3 is a flow chart illustrating an embodiment of a process for configuring a content overlay service.

FIG. 3 is a flow chart illustrating an embodiment of a process for configuring a content overlay service. Using the process of FIG. 3, a content overlay service for embedding an engagement widget on a primary website is configured. Using the embedded engagement widget, external application services can be accessed from the primary website. Although the engagement widget is embedded at and accessed via the primary website, the underlying overlay service is provided by an engagement widget service separate from the primary website. In some embodiments, the process of FIG. 3 is performed at 201 of FIG. 2. In some embodiments, the primary website is hosted at primary web service 103 of FIG. 1, the engagement widget service is engagement widget service 121 of FIG. 1, and/or the external application services accessible from within the configured engagement widget are external application services 111, 113, and/or 115 of FIG. 1.

At 301, external application services are configured. For example, an organization sets up accounts with different external application services and configures those respective service offerings. Example external application services include services for product ordering, product shipping, product tracking, billing, interacting with customer help assistants including live and/or virtual agents, customer relationship management (CRM) systems, enterprise resource planning (ERP) systems, IT ticketing systems, third-party web documents, third-party widgets, and content management systems, among others. In some embodiments, the external application service is a remote database table service and allows the user to access, query, and manipulate remote database tables and their entries. In some embodiments, one or more configured application services, such as the example services listed above, are hosted by the primary web service with the webpage that embeds an engagement widget. Although an application service is local to the webpage, it can be configured as an external application service with respect to the engagement widget service.

At 303, a new engagement widget is created. For example, a client with proper permissions and/or credentials, such as one associated with an administrator or operator of an organization, can access a web-based configuration service of the engagement widget service to initialize and create a new engagement widget. In some embodiments, the new widget is created based on an existing widget or a widget template. In various embodiments, the configuration and setup parameters of the newly created engagement widget are stored at a data store associated with the engagement widget service.

At 305, external services are linked to the engagement widget. For example, the services configured at 301 are linked to the engagement widget created at 303. In some embodiments, each service requires access parameters and credentials such as a network address, connection protocol, and access credentials. For example, in some embodiments, the external service is linked using at least an Application Programming Interface (API) key although other access configuration parameters may be appropriate as well.

At 307, the widget content layout is configured. For example, using the configuration service of the engagement widget service, the user interface of the widget is configured. In some embodiments, the content layout configuration includes what content should be displayed, where the content should be displayed, and when the content should be displayed, among other properties. For example, once the configuration details of an external data source are provided, what data to fetch and how to display the fetched data is configured. In various embodiments, the user layout is configured using a graphical user interface and different related display options are provided. In some embodiments, the options include functional display options such as user interface components with the ability to initiate additional processing. For example, an external service for accessing user order information can be configured to display details related to historical orders, details related to the current order, and user interface elements to allow the user to request an order replacement. As another example, an external service for ordering or requesting information on a product can also be configured to display featured products, most purchased products, and relevant products. In some embodiments, the configuration service of the engagement widget service includes a preview feature that allows the operator to preview the appearance and/or functionality of the engagement widget prior to embedding the widget in the appropriate webpage.

At 309, the engagement widget is enabled. For example, once the configuration of the widget is complete, the engagement widget is enabled and serviced by the engagement widget service. In various embodiments, the engagement widget service provides a source code module or snippet that is inserted into one or more webpages of a primary web service. By inserting the provided source code module, the configured engagement widget is embedded within the relevant webpages. When one of the relevant webpages is accessed, the enabled widget provides the configured functionality to access the configured external services.

Figure 4:
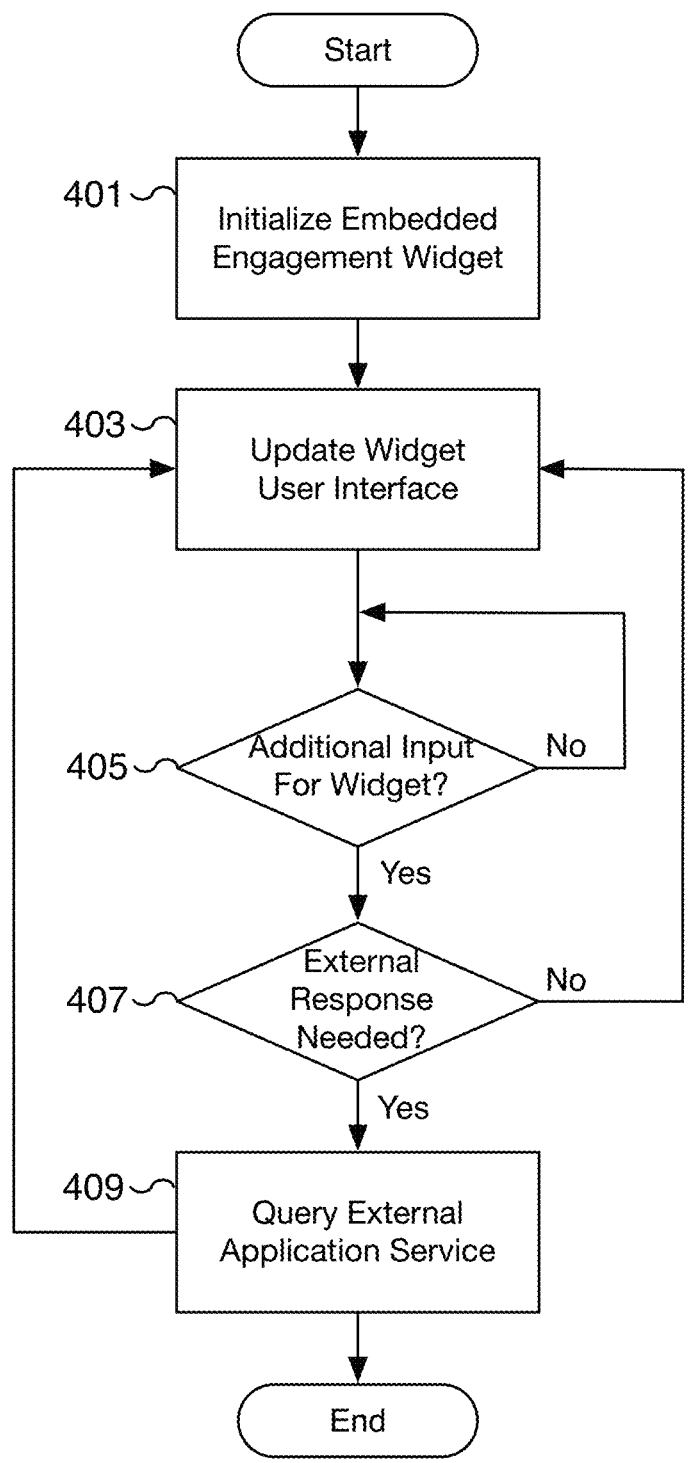
FIG. 4 is a flow chart illustrating an embodiment of a process for providing an engagement widget embedded within a webpage of a primary web service.

FIG. 4 is a flow chart illustrating an embodiment of a process for providing an engagement widget embedded within a webpage of a primary web service. Using the process of FIG. 4, an engagement widget embedded on a webpage of a primary web service provides users access to different services including external application services. For example, from a website such as the homepage of an organization hosted at a primary web service, a user can access multiple external services such as services offering product ordering, product tracking, and customer help. With respect to a corporate website, an employee can access example external services from a corporate website such as services related to a customer relationship management (CRM) system, an enterprise resource planning (ERP) system, an IT ticketing system, and a content management system, among others. In some embodiments, the process of FIG. 4 is performed at 207 and/or 209 of FIG. 2. In some embodiments, the primary website is hosted at primary web service 103 of FIG. 1, the engagement widget service is engagement widget service 121 of FIG. 1, and/or the external application services accessible from within the configured engagement widget are external application services 111, 113, and/or 115 of FIG. 1.

At 401, an embedded engagement widget is initialized. For example, a user visits a webpage with the source code module (or source code snippet) of an embedded engagement widget. As part of processing the webpage by the web client, the included source code module initializes the widget for displaying within the accessed webpage. In some embodiments, the embedded engagement widget is further provided with initialization data such as cookie data and/or other environmental variables/parameters of the webpage/web server. For example, in some embodiments, the contents of the embedded engagement widget are customized for each user and the widget is provided with user credentials.

At 403, the user interface of the embedded engagement widget is updated. For example, the content and layout of the content of the embedded engagement widget is updated. In some embodiments, the widget's user interface is updated based on the input received at the embedded engagement widget including initialization parameters received at 401 and/or user input received and detected at 405. In various embodiments, the contents and/or parameters for the updated user interface are provided to the web browser or similar client of the webpage by communicating with the engagement widget service via the embedded engagement widget. In some embodiments, the content is content provided in response to a query by the engagement widget service to an external application service on behalf of the embedded engagement widget.

At 405, a determination is made whether additional input is available for the embedded engagement widget to process. In the event additional input is available for the embedded engagement widget to process, processing proceeds to 407. In the event additional input is not available for the embedded engagement widget to process, processing loops back at 405 until relevant input is available to the embedded engagement widget.

At 407, a determination is made whether an external response is needed. For example, in some scenarios, the additional input received and detected by the widget at 405 can require accessing content at an external application service. In the event an external response is needed, processing proceeds to 409. In the event an external response is not needed, processing loops back to 403. For example, an external response is not needed if the processing can be performed locally and/or by the engagement widget service without querying an external application service.

At 409, an external application service is queried. For example, the external application service accessed by the user via the engagement widget is queried for content. In some embodiments, the external application service is queried via the engagement widget service. For example, the engagement widget service accesses the external application service using the appropriately configured domain and credentials such as an Application Programming Interface (API) key for the specific external application service. Once the external application service is queried and a response is received, the user interface of the widget is updated at 403.

Figure 5:
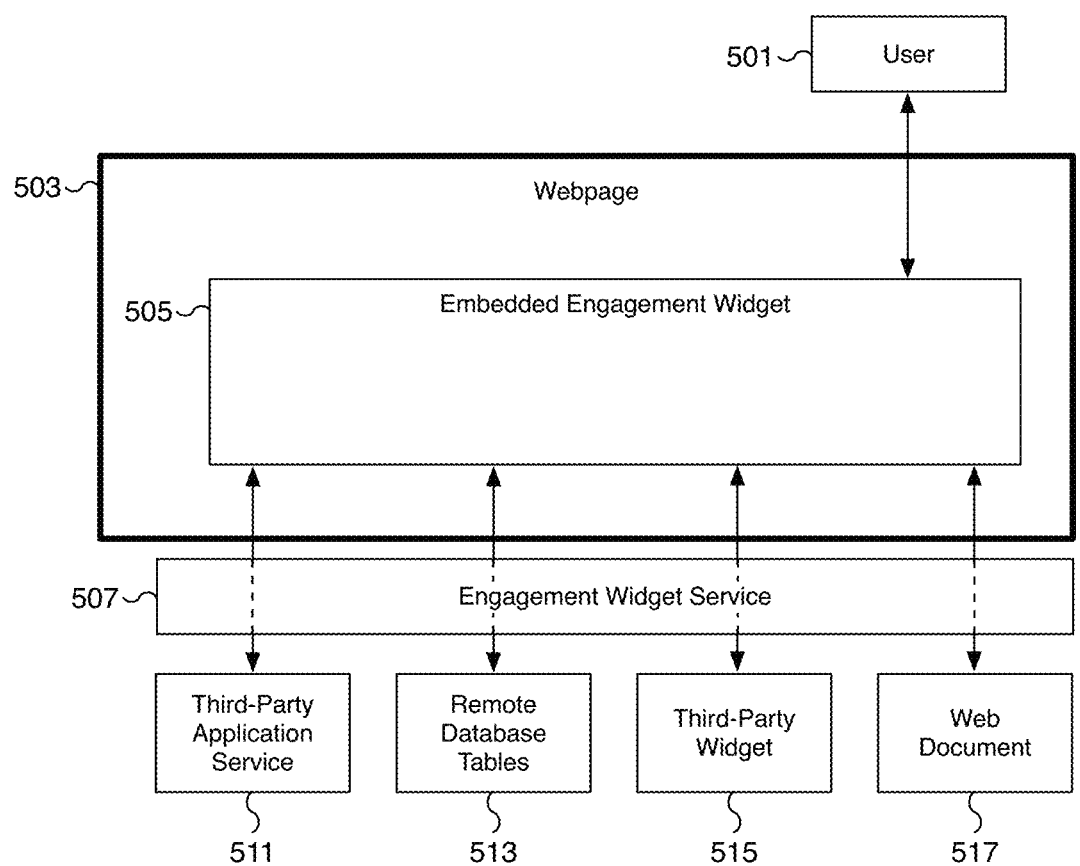
FIG. 5 is a block diagram illustrating an example of an engagement widget embedded within a webpage of a primary web service for accessing different application services.

FIG. 5 is a block diagram illustrating an example of an engagement widget embedded within a webpage of a primary web service for accessing different application services. In the example shown, user 501 is a network client that accesses webpage 503. Webpage 503 is a webpage hosted on a primary web service and includes embedded engagement widget 505. Embedded engagement widget 505 is configured to access multiple different application services including third-party application service 511, remote database tables 513, third-party widget 515, and web document 517. Third-party application service 511, remote database tables 513, third-party widget 515, and web document 517 are not hosted by the primary web service hosting webpage 503 and each is an external application service and/or content provided by an external application service. In some embodiments, user 501 is client 101 of FIG. 1, webpage 503 with embedded engagement widget 505 is hosted by primary web service 103 of FIG. 1, engagement widget service 507 is engagement widget service 121 of FIG. 1, and/or third-party application service 511, remote database tables 513, third-party widget 515, and/or web document 517 is associated with one or more of external application services 111, 113, and/or 115 of FIG. 1. In various embodiments, embedded engagement widget 505 is configured and implemented using the processes of FIGS. 2-4.

In the example shown, webpage 503 includes embedded engagement widget 505, which allows user 501 to access multiple different external application services such as third-party application service 511, remote database tables 513, third-party widget 515, and web document 517 by accessing webpage 503. In some embodiments, embedded engagement widget 505 is embedded as part of webpage 503 by inserting a provided source code module or snippet provided by engagement widget service 507. The inserted source code references engagement widget service 507 which provides the updated content for embedded engagement widget 505. In various embodiments, the behavior of embedded engagement widget 505 is based at least in part on user input. In the example of FIG. 5, the arrows connecting user 501 to embedded engagement widget 505 correspond to input provided by user 501 to embedded engagement widget 505 when accessing webpage 503 and the corresponding updates of embedded engagement widget 505 provided to user 501. Examples of user input include mouse clicks, mouse navigation, keyboard input, touch input, and/or other user interface actions provided by user 501 as part of interacting with embedded engagement widget 505.

In the example shown, engagement widget service 507 is positioned between embedded engagement widget 505 and the different external application services corresponding to third-party application service 511, remote database tables 513, third-party widget 515, and web document 517. The arrows between embedded engagement widget 505 and each of third-party application service 511, remote database tables 513, third-party widget 515, and web document 517 that pass-through engagement widget service 507 correspond to the communication path utilized for embedding the corresponding external application services. For each external application service, engagement widget service 507 functions as a content overlay service to provide the requested content from the external application service for display within embedded engagement widget 505. For example, engagement widget service 507 interfaces with third-party application service 511 to provide the functionality of third-party application service 511 within embedded engagement widget 505. Examples of services implemented by third-party application service 511 include a customer relationship management (CRM) service, an enterprise resource planning (ERP) service, an order processing service, an IT ticketing service, and a content management service, among others. As another example, engagement widget service 507 interfaces with remote database tables 513 to provide user 501 with a user interface to access, modify, and query, among other database actions, one or more remotely located database tables and their entries. In the example shown, engagement widget service 507 further interfaces with third-party widget 515 and web document 517 to provide user 501 with an externally sourced third-party widget and web document, respectively, for display within embedded engagement widget 505. In various embodiments, user 501 can also interact with the provided third-party widget and web document.

Figure 6:
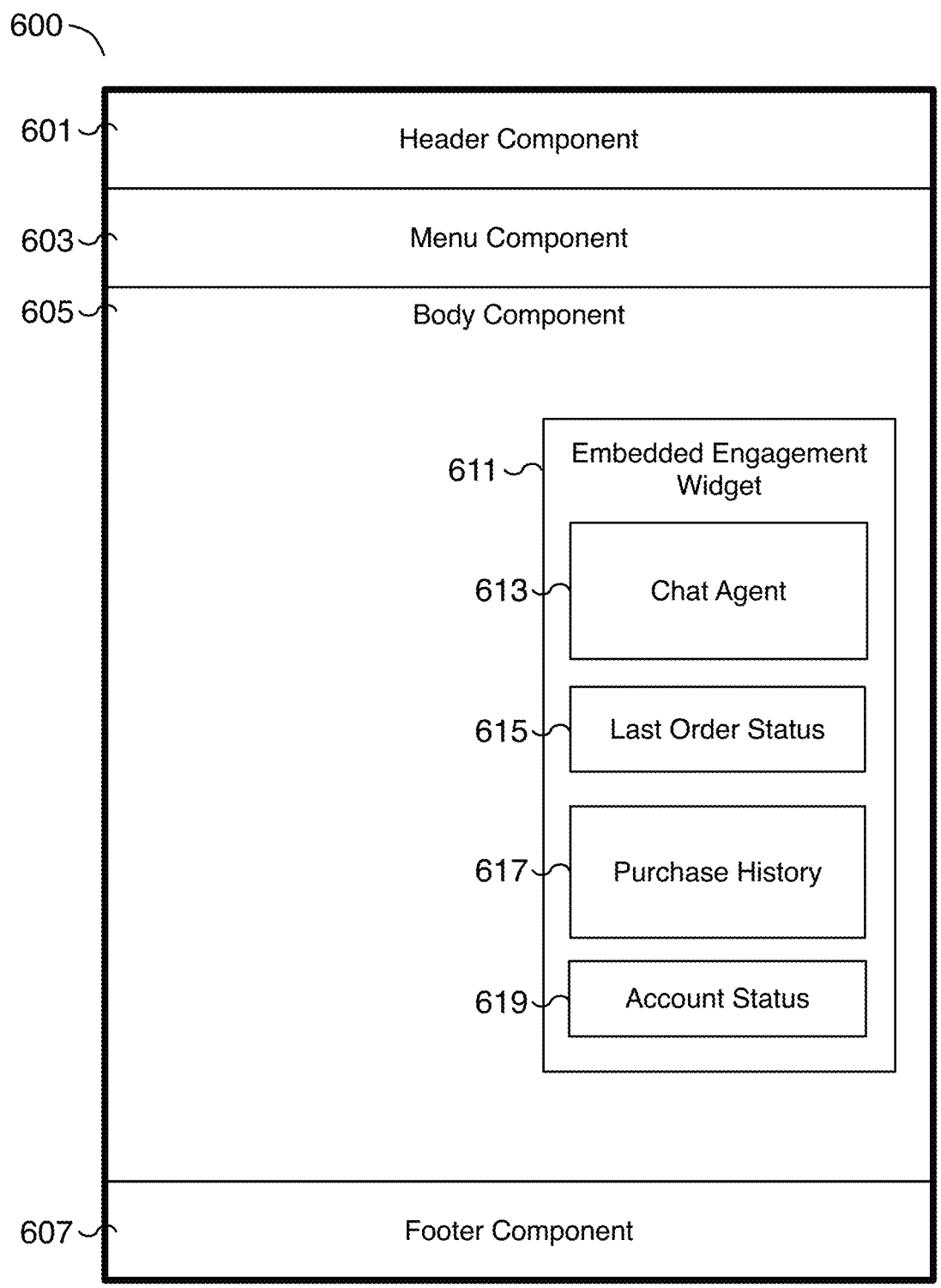
FIG. 6 is a block diagram illustrating an example of a webpage that embeds an engagement widget.

FIG. 6 is a block diagram illustrating an example of a webpage that embeds an engagement widget. In the example shown, webpage 600 is constructed using components including header component 601, menu component 603, body component 605, and footer widget 607. As shown in the example, body component 605 further includes embedded engagement widget 611. Within embedded engagement widget 611 are chat agent component 613, last order status component 615, purchase history component 617, and account status component 619. Each of chat agent component 613, last order status component 615, purchase history component 617, and account status component 619 correspond to an external application service. In some embodiments, webpage 600 is webpage 503 of FIG. 5 and embedded engagement widget 611 is embedded engagement widget 505 of FIG. 5. In some embodiments, webpage 600 with embedded engagement widget 611 is hosted by primary web service 103 of FIG. 1, and the functionality of embedded engagement widget 611 is provided at least in part by engagement widget service 121 of FIG. 1. In some embodiments, the different external application services of chat agent component 613, last order status component 615, purchase history component 617, and account status component 619 are associated with one or more of external application services 111, 113, and/or 115 of FIG. 1. In various embodiments, embedded engagement widget 611 is configured and implemented using the processes of FIGS. 2-4.

As shown in the example, embedded engagement widget 611 is accessible from webpage 600 and exposes the functionality of chat agent component 613, last order status component 615, purchase history component 617, and account status component 619 to any user visiting webpage 600. Although shown together in embedded engagement widget 611, chat agent component 613, last order status component 615, purchase history component 617, and account status component 619 may not each be fully visible/accessible at the same time. For example, a user can collapse the purchase history details of purchase history component 617 while involved in a chat session using chat agent component 613. Similarly, chat agent component 613 can be in a minimized form with no chat session active while a user is searching through past purchases using purchase history component 617. In various embodiments, the functionality and/or content of each of chat agent component 613, last order status component 615, purchase history component 617, and account status component 619 is provided by a corresponding external application service via an engagement widget service. For example, user input provided to each of the components can be processed by the engagement widget service and used to interface with the corresponding external application service to update the content and/or display of embedded engagement widget 611.

Figure 7:
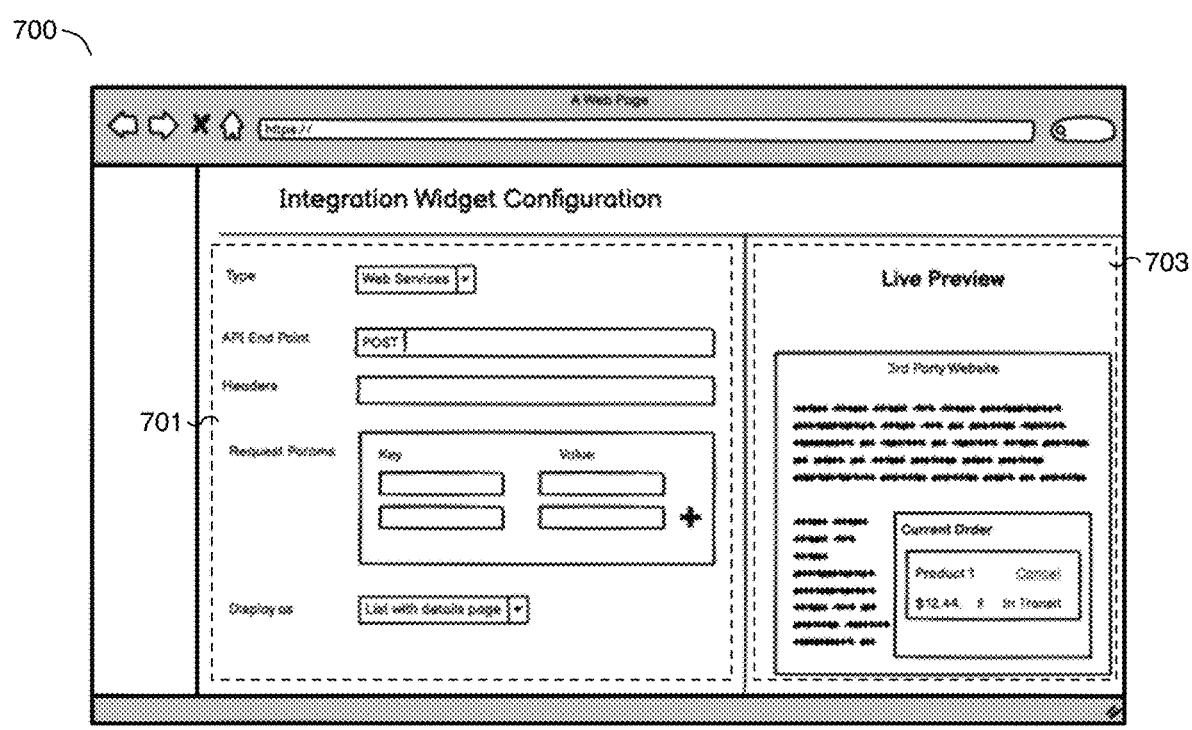
FIG. 7 is a diagram illustrating an example of a configuration webpage for an embedded engagement widget.

FIG. 7 is a diagram illustrating an example of a configuration webpage for an embedded engagement widget. In the example shown, configuration webpage 700 is provided by an engagement widget service and includes configuration pane 701 and live preview pane 703. In the example shown, configuration webpage 700 is used to configure one of potentially multiple application services for an engagement widget. In the example shown, configuration pane 701 includes multiple dialog boxes for configuring an external application service. For example, configuration pane 701 includes a drop-down menu for selecting a type of external application service to configure. As shown in FIG. 7, the type of service selected is "Web Services." The selected application service can be configured with an Application Programming Interface (API) End Point and Headers. For example, an API End Point can be configured by providing a URL for initiating a POST request along with the configured headers. In addition to configuring the external application service, configuration pane 701 allows for the configuration of the data to retrieve for and display within the engagement widget. In the example shown, the data to retrieve and display is provided as request parameters specified as key/value pairs. In some embodiments, default techniques for displaying the requested content are provided and can be selected from. In the example shown, the requested content from the external application service is displayed as a list with a details page.

In the example shown, configuration webpage 700 also includes live preview pane 703. In various embodiments, live preview pane 703 can display a preview of the embedded widget as configured in configuration pane 701. In some embodiments, live preview pane 703 can display a preview of the widget as embedded in a webpage as currently configured without impacting the actual live website. As shown in the example, live preview pane 703 is shown as a preview for a current order widget embedded in a website. The preview shown in live preview pane 703 is a placeholder preview for illustrative purposes since the configuration of the external application service for the engagement widget, as shown in configuration pane 701, is incomplete.

Figure 8:
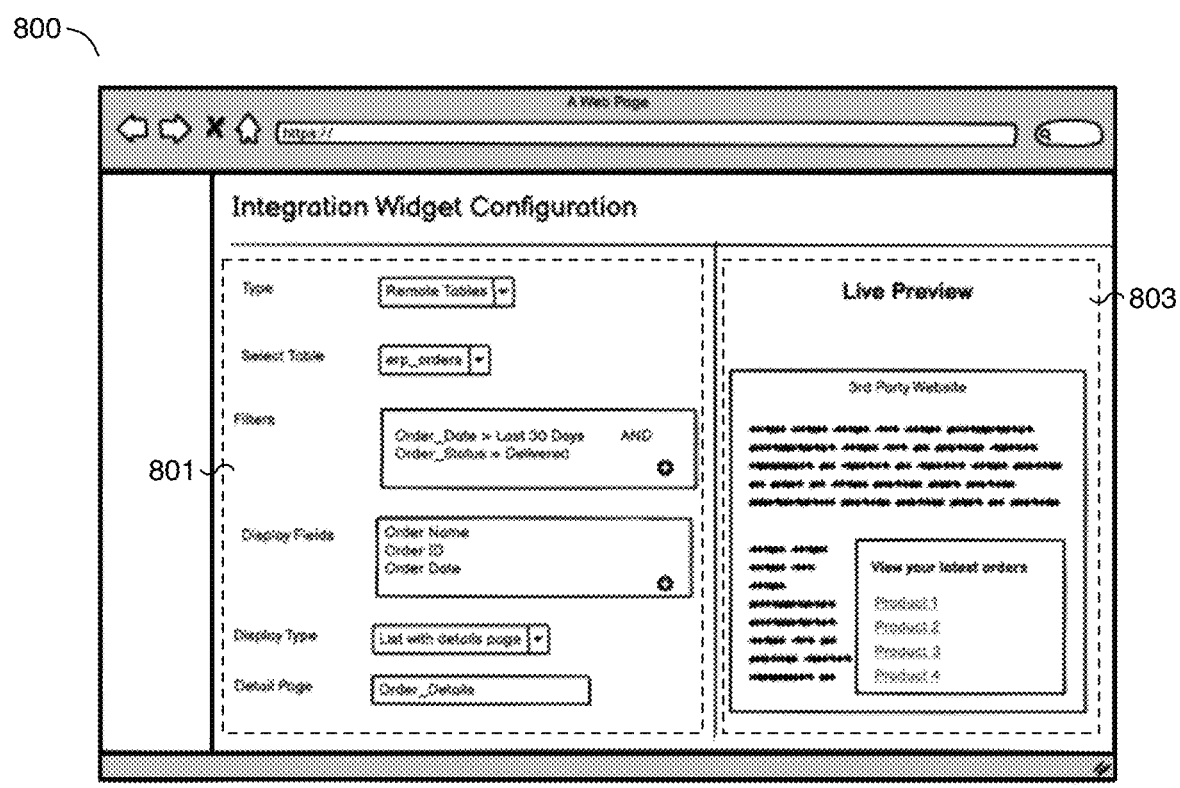
FIG. 8 is a diagram illustrating an example of a configuration webpage for an embedded engagement widget.

FIG. 8 is a diagram illustrating an example of a configuration webpage for an embedded engagement widget. In the example shown, configuration webpage 800 is provided by an engagement widget service and includes configuration pane 801 and live preview pane 803. In the example shown, configuration webpage 800 is used to configure one of potentially multiple application services for an engagement widget. In the example shown, configuration pane 801 includes multiple dialog boxes for configuring a remote database tables service to retrieve and display entries from remote database tables. For example, configuration pane 801 includes a drop-down menu for selecting a type of external application service to configure. As shown in FIG. 8, the type of service selected is "Remote Tables." The selected remote tables application service can be configured by selecting parameters for a database table, filters, display fields, a display type, and a details page. For example, using configuration pane 801, an embedded engagement widget can be configured by providing configuration parameters for a database table and database fields of the database table. The provided configuration parameters can further include database filters associated with the database table such as filters that should be used to construct a database query for accessing the corresponding database table.

In some embodiments, similar to configuration pane 701 of configuration webpage 700 of FIG. 7, configuration pane 801 allows for configuring the source of the data, what data should be retrieved and displayed, and how to display the requested data. Similar to preview pane 703 of configuration webpage 700 of FIG. 7, configuration webpage 800 also includes a live preview of the configured external application service in live preview pane 803. In the example shown, live preview pane 803 shows the latest orders. The preview shown in live preview pane 803 is a placeholder preview for illustrative purposes since the configuration of the remote tables service for the engagement widget, as shown in configuration pane 801, is incomplete.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method, comprising:
providing, by a second-party service provider, a graphical interface for specifying parameters for content of a third-party content provider configured for a first-party customer, wherein the first-party customer, the second-party service provider, and the third-party content provider are different parties;
receiving, by the second-party service provider via the graphical interface, the parameters from the first-party customer for the content of the third-party content provider, wherein the received parameters include an access parameter including login credentials, wherein the received parameters identify a content layout configuration for an overlay, wherein the received parameters include an Application Programming Interface (API) end point and headers associated with the API end point; and
providing, by the second-party service provider, a code snippet to include on a source encoding of a web content of the first-party customer to display, in the overlay on the web content of the first-party customer according to the identified content layout configuration for the overlay, the content of the third-party content provider, wherein the content of the third-party content provider is obtained using the received parameters from the first-party customer, wherein obtaining the content includes using the headers and accessing the API end point using the access parameter, wherein the code snippet references a service resource of the second-party service provider; and
wherein the graphical interface provided by the second-party service provider for specifying the parameters for the content of the third-party content provider configured for the first-party customer is separate from the web content of the first-party customer and the service resource of the second-party service provider is hosted by a second server of the second-party service provider different from a third server of the third-party content provider providing the content of the third-party content provider in the overlay on the web content hosted by a first server of the first-party customer.

2. The method of claim 1, wherein the content of the third-party content provider is associated with a customer relationship management (CRM) service, an enterprise resource planning (ERP) service, an order processing service, an IT ticketing service, a content management system service, a remote database table service, or a chat agent service.

3. The method of claim 1, wherein the received parameters are received by the second-party service provider and the service resource of the second-party service provider is provided by the second server different from a device executing the code snippet.

4. The method of claim 1, wherein the access parameter received from the first-party customer for the content of the third-party content provider further includes a domain.

5. The method of claim 1, further comprising: providing by the second-party service provider, a preview of the overlay.

6. The method of claim 5, wherein the preview of the overlay includes the content of the third-party content provider obtained using the received parameters.

7. The method of claim 1, wherein the content of the third-party content provider is associated with a remote database table service, and wherein the received parameters identify a database table and database fields of the database table.

8. The method of claim 7, wherein the received parameters further identify database filters associated with the database table.

9. A system, comprising:
one or more processors; and
a memory coupled to the one or more processors, wherein the memory is configured to provide the one or more processors with instructions which when executed cause the one or more processors to:
provide, by a second-party service provider, a graphical interface for specifying parameters for content of a third-party content provider configured for a first-party customer, wherein the first-party customer, the second-party service provider, and the third-party content provider are different parties;
receive, by the second-party service provider via the graphical interface, the parameters from the first-party customer for the content of the third-party content provider, wherein the received parameters include an access parameter including login credentials, wherein the received parameters identify a content layout configuration for an overlay, wherein the received parameters include an Application Programming Interface (API) end point and headers associated with the API end point; and
provide, by the second-party service provider, a code snippet to include on a source encoding of a web content of the first-party customer to display, in the overlay on the web content of the first-party customer according to the identified content layout configuration for the overlay, the content of the third-party content provider, wherein the content of the third-party content provider is obtained using the received parameters from the first-party customer, wherein obtaining the content includes using the headers and accessing the API end point using the access parameter, wherein the code snippet references a service resource of the second-party service provider; and
wherein the graphical interface provided by the second-party service provider for specifying the parameters for the content of the third-party content provider configured for the first-party customer is separate from the web content of the first-party customer and the service resource of the second-party service provider is hosted by a second server of the second-party service provider different from a third server of the third-party content provider providing the content of the third-party content provider in the overlay on the web content hosted by a first server of the first-party customer.

10. The system of claim 9, wherein the content of the third-party content provider is associated with a customer relationship management (CRM) service, an enterprise resource planning (ERP) service, an order processing service, an IT ticketing service, a content management system service, a remote database table service, or a chat agent service.

11. The system of claim 9, wherein the received parameters are received by the second-party service provider and the service resource of the second-party service provider is provided by the second server different from a device executing the code snippet.

12. The system of claim 9, wherein the access parameter received from the first-party customer for the content of the third-party content provider further includes a domain.

13. The system of claim 9, wherein the memory is further configured to provide the one or more processors with further instructions which when executed cause the one or more processors to provide a preview of the overlay.

14. The system of claim 13, wherein the preview of the overlay includes the content of the third-party content provider obtained using the received parameters.

15. The system of claim 9, wherein the content of the third-party content provider is associated with a remote database table service, and wherein the received parameters identify a database table, database fields of the database table, and database filters associated with the database table.

16. A computer program product, the computer program product being embodied in a non-transitory computer readable storage medium and comprising computer instructions for:

providing, by a second-party service provider, a graphical interface for specifying parameters for content of a third-party content provider configured for a first-party customer, wherein the first-party customer, the second-party service provider, and the third-party content provider are different parties;

receiving, by the second-party service provider via the graphical interface, the parameters from the first-party customer for the content of the third-party content provider, wherein the received parameters include an access parameter including login credentials, wherein the received parameters identify a content layout configuration for an overlay, wherein the received parameters include an Application Programming Interface (API) end point and headers associated with the API end point; and providing, by the second-party service provider, a code snippet to include on a source encoding of a web content of the first-party customer to display, in the overlay on the web content of the first-party customer according to the identified content layout configuration for the overlay, the content of the third-party content provider, wherein the content of the third-party content provider is obtained using the received parameters from the first-party customer, wherein obtaining the content includes using the headers and accessing the API end point using the access parameter, wherein the code snippet references a service resource of the second-party service provider; and wherein the graphical interface provided by the second-party service provider for specifying the parameters for the content of the third-party content provider configured for the first-party customer is separate from the web content of the first-party customer and the service resource of the second-party service provider is hosted by a second server of the second-party service provider different from a third server of the third-party content provider providing the content of the third-party content provider in the overlay on the web content hosted by a first server of the first-party customer.

* * * * *